United States Patent
Thrush et al.

(10) Patent No.: US 7,504,613 B2
(45) Date of Patent: Mar. 17, 2009

(54) OPTICAL IMAGING SYSTEM HAVING AN ILLUMINATION SOURCE BETWEEN OBJECT AND IMAGE

(75) Inventors: Evan Thrush, Menlo Park, CA (US); Jonathan Ziebarth, Mountain View, CA (US); James S. Harris, Jr., Stanford, CA (US); Michael D. McGehee, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 571 days.

(21) Appl. No.: 11/078,648

(22) Filed: Mar. 11, 2005

(65) Prior Publication Data

US 2005/0211876 A1      Sep. 29, 2005

Related U.S. Application Data

(60) Provisional application No. 60/556,597, filed on Mar. 25, 2004.

(51) Int. Cl.
*H01L 27/00* (2006.01)
*G02B 6/06* (2006.01)

(52) U.S. Cl. .............. 250/208.1; 250/227.2; 359/385; 600/407

(58) Field of Classification Search .......... 250/208.1, 250/216, 239, 221, 222.1, 227.2, 227.11; 359/385, 387–390; 600/407, 473, 476

See application file for complete search history.

(56) References Cited

U.S. PATENT DOCUMENTS

| 4,988,188 A | 1/1991 | Ohta ........................ 353/122 |
| 5,098,184 A | 3/1992 | Van den Brandt et al. ... 353/102 |
| 5,690,417 A * | 11/1997 | Polidor et al. ............... 362/244 |
| 6,179,439 B1 * | 1/2001 | Choate ....................... 362/247 |
| 6,222,677 B1 | 4/2001 | Budd et al. ................. 359/630 |
| 6,480,337 B2 | 11/2002 | Inoguchi et al. ............ 359/630 |
| 6,565,231 B1 | 5/2003 | Cok ............................ 362/226 |
| 6,712,471 B1 | 3/2004 | Travis et al. .................. 353/7 |
| 2002/0109774 A1 | 8/2002 | Meron et al. ................. 348/74 |
| 2003/0095079 A1 | 5/2003 | Ishikawa et al. .............. 345/6 |

* cited by examiner

*Primary Examiner*—John R Lee
(74) *Attorney, Agent, or Firm*—Lumen Patent Firm

(57) ABSTRACT

An optical imaging system having an optical source located between the object being imaged and the sensor is provided. Such positioning of the source enables provision of compact optical imaging systems. In particular, such systems can have image widths significantly larger than the object to sensor separation. The arrangement of source, imaging assembly and sensor is such that an image of the source is not formed at the sensor. Therefore, the effect of this source positioning on the image of the object at the sensor is a reduction of intensity, as opposed to more objectionable imaging artifacts, such as spurious shadows and/or bright spots. Thus compact optical imaging systems having good image quality are provided, which enables high-fidelity imaging of object to sensor for a wide variety of applications.

14 Claims, 3 Drawing Sheets

OPTICAL IMAGING SYSTEM HAVING AN ILLUMINATION SOURCE BETWEEN OBJECT AND IMAGE

CROSS REFERENCE TO RELATED APPLICATIONS

This application claims the benefit of U.S. provisional application 60/556,597, filed on Mar. 25, 2004, entitled "Optical Imaging System having an Illumination Source between Object and Image", and hereby incorporated by reference in its entirety.

FIELD OF THE INVENTION

This invention relates to optical imaging systems.

BACKGROUND

An optical imaging system provides an image of an object to a sensor. Thus an optical imaging system includes an image forming assembly (e.g., a lens, a mirror, etc), and a sensor (e.g., photographic film, a detector array or a CCD array, etc.). Optical imaging systems for objects which are not self-luminous also include an optical source for illuminating the object.

FIGS. 1a-c show various known configurations for providing illumination in an optical imaging system. The configurations of FIGS. 1a, 1b and 1c are back illumination, side illumination and beam splitter illumination respectively. In the back illumination scheme of FIG. 1a, a source 102 illuminates a back side of an object 104. Light from object 104 passes through an imaging assembly 106 and provides an image to sensor 108. In this approach, object 104 must transmit some fraction of the light provided by source 102. Microscopy of transparent objects is often performed in the back illumination arrangement of FIG. 1a. Other examples of back illumination include U.S. Pat. No. 4,988,188, U.S. Pat. No. 5,098,184, and US 2003/0095079.

FIG. 1b shows side illumination, where source 102 illuminates object 104 from the side. Radiation from object 104 passes through imaging assembly 106 and provides an image to sensor 108. Here "side illumination" indicates that source 102 is not in the way of light passing from object 104 to sensor 108. Unlike back illumination, side illumination is applicable to opaque objects. A very common example of side illumination in practice is reading a book by light from an artificial light source. Other example of side illumination include U.S. Pat. No. 6,222,677, U.S. Pat. No. 6,480,337, U.S. Pat. No. 6,712,471, and US 2002/0109774.

FIG. 1c shows beam splitter illumination. In this arrangement, some light from source 102 is deflected toward object 104 by a beam splitter 112. Light from object 104 passes through imaging assembly 106. A fraction of the light passing through imaging assembly 106 also passes through beam splitter 112 to provide an image to sensor 108. Beam splitter illumination is more complicated than back or side illumination, so it is usually reserved for cases where back or side illumination is inapplicable. One example of such an application is microscopy of opaque objects.

The arrangement of the illumination source has a strong effect on how compact an optical imaging system can be made. For example, the back illumination arrangement of FIG. 1a can be made quite compact, for example by positioning a flat-panel light source in close proximity to object 104. In contrast, side illumination and beam splitter illumination (i.e., FIGS. 1b and 1c respectively) tend to be less amenable to compact arrangements. For example, in side illumination, clearance must be provided to allow radiation from source 102 to reach object 104. This requirement for clearance tends to make it difficult to reduce the separation between object 104 and imaging assembly 106. Similarly, in beam splitter illumination, the beam splitter typically has a width on the order of the width of a region being imaged. Since the beam splitter is angled with respect to the optical path between object and sensor (i.e., the optical axis), it requires a amount of space along the optical axis comparable to its width. This factor makes it especially difficult to obtain a compact beam splitter imaging system that has a wide field of view.

The effect of the illumination arrangement on imaging system compactness can be appreciated by considering outlines 110 on FIGS. 1a-c. Outlines 110 closely surround all elements of the respective optical imaging systems, and schematically indicate what aspects of the arrangement are significant in terms of determining overall size. In all three cases, the illumination scheme significantly affects outline 110 (more so on FIGS. 1b and 1c than on FIG. 1a).

Since conventional provision of illumination for an optical imaging system is seen to undesirably increase system size, it would be an advance in the art to provide compact illumination for an optical imaging system. It would be a further advance in the art to provide compact illumination for an optical imaging system applicable to opaque objects. It would be another advance in the art to provide a wide-field optical imaging system having an object to sensor separation substantially less than the image width.

SUMMARY

An optical imaging system having an optical source located between the object being imaged and the sensor is provided according to the invention. Such positioning of the source enables provision of compact optical imaging systems. In particular, such systems can have image widths significantly larger than the object to sensor separation. The arrangement of source, imaging assembly and sensor is such that an image of the source is not formed at the sensor. Therefore, the effect of this source positioning on the image of the object at the sensor is a reduction of intensity, as opposed to more objectionable imaging artifacts, such as spurious shadows and/or bright spots.

Thus the invention advantageously provides a compact optical imaging system having good image quality, which enables high-fidelity imaging of object to sensor for a wide variety of applications. Such applications include biological applications (e.g., in vivo monitoring) and non-biological applications (e.g., scanning, photocopying, and wide-field imaging).

DETAILED DESCRIPTION

Figure 2:
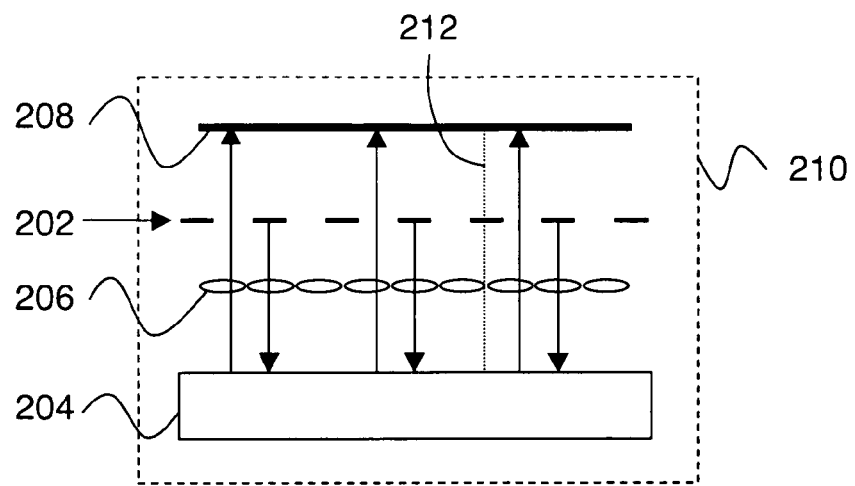
FIG. 2 shows an optical imaging system according to an embodiment of the invention.

FIG. 2 shows an optical imaging system according to an embodiment of the invention. An optical source 202 illuminates an object 204. Light from object 204 passes through an imaging assembly 206 to provide an image to a sensor 208. In this example, imaging assembly 206 is shown as a micro-lens array. However, any optical imaging assembly can be used in practicing the invention, including lenses, mirrors, arrays of micro-optical elements (e.g., micro-lenses and/or micro-mirrors), and any combination thereof. In some cases, the image is viewed directly by a user of the system (i.e., sensor 208 is an observer's eye). However, in most cases, sensor 208 is an image sensor. Suitable image sensors include photographic film, and 1-D or 2-D detector arrays or CCD arrays.

Figure 1A:
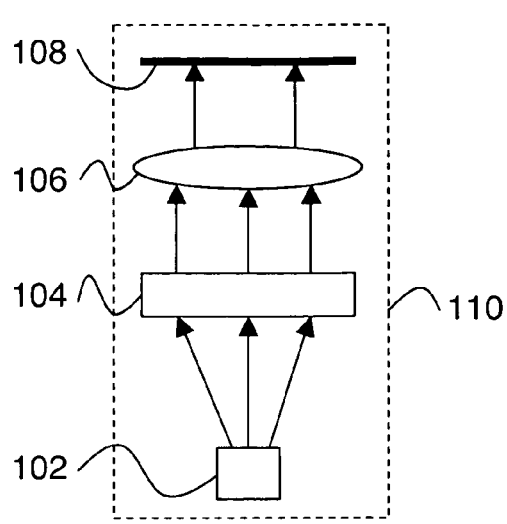
FIGS. 1a-c show conventional illumination arrangements for optical imaging systems.
Figure 1B:
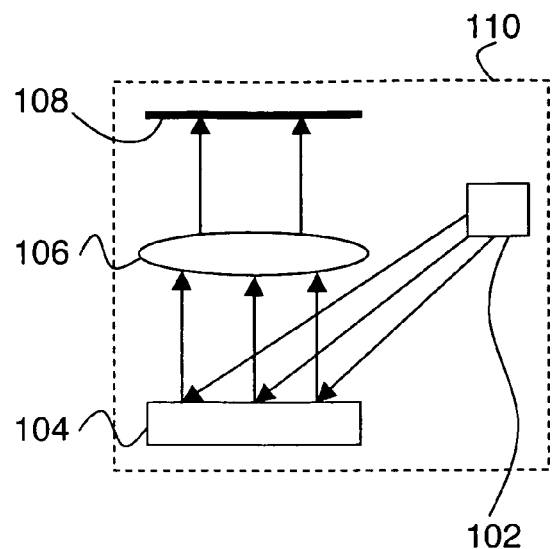
Figure 1C:
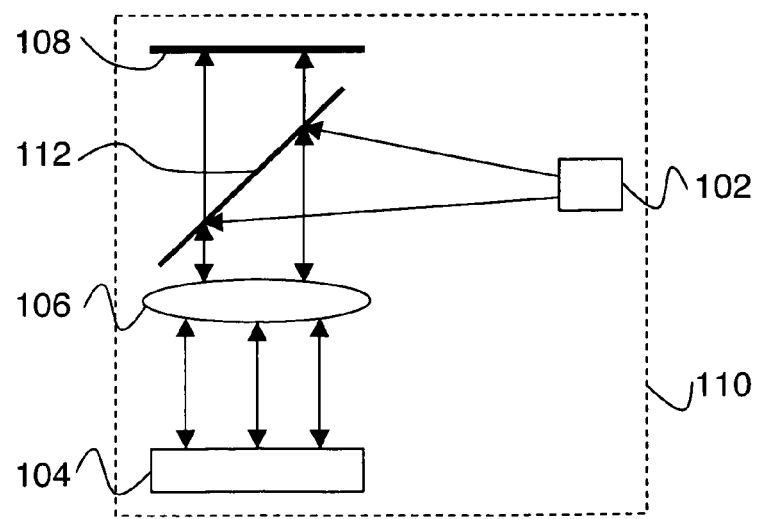

The positioning of source 202 is a key aspect of the invention. More specifically, source 202 is positioned at a location on an optical path 212 between object 204 and sensor 208. This positioning advantageously enables the imaging system of FIG. 2 to be very compact, as shown by outline 210. This positioning is also in sharp contrast to the conventional source positionings shown on FIGS. 1a-c. However, this positioning of source 202 on optical path 212 causes the source to interfere with some of the light traveling from object 204 to sensor 208.

Therefore, mitigating the effect of this interference on image quality is another key aspect of the invention. For example, consider a preferred embodiment of source 202 that includes multiple small emitting regions that emit light toward object 204 but substantially do not directly illuminate sensor 208. Such emitters can be, for example, light emitting diodes (LEDs) facing object 204 and having an opaque back side. An image of such a source at sensor 208 would include numerous small, sharp shadows, one for each emitter. The presence of such an image of source 202 at sensor 208 is clearly undesirable. Similarly, an alternate embodiment of source 202 having emitters that radiate toward both object 204 and sensor 208 would have an image including numerous small bright spots.

According to the invention, the arrangement of source 202, imaging assembly 206 and sensor 208 is such that an image of source 202 is substantially not provided to sensor 208. Arrangement of elements 202, 204, 206, and 208 in order to simultaneously provide imaging of object 204 and non-imaging of source 202 to sensor 208 is within the skill of an art worker. In the preceding example, the effect of such an arrangement is that the shadows cast by the source elements at sensor 208 are blurred. For small emitters, such blurring can make the effect of the source interference on image quality negligible. Although some light from object 204 is lost, the image quality is preserved. Similarly, for the alternate source embodiment, blurring of the small bright spots will improve the quality of the image of object 204. For this less-preferred alternative, there can be a loss of image contrast due to the direct illumination of sensor 208 by source 202.

The primary effect of the positioning of source 202 according to the invention is a reduction of image intensity, instead of introduction of image artifacts (e.g., shadows), because the source is positioned at a non-imaging plane between the object and the sensor. This reduction of image intensity is roughly equal to the ratio of the blocked area of source 202 to the total area of source 202. Thus this intensity loss can readily be selected by design of the source, and is preferably less than about 10% and more preferably is less than about 5%.

According to the invention, optical imaging systems having object to image separation much less than image width are provided. Therefore, embodiments of the present invention can be miniaturized to a greater degree than conventional optical imaging systems. For example, as shown on FIG. 2, an array of short-focal length lenses can be used as the image-forming element in an embodiment of the invention. Such a lens array will have a small working distance (i.e., distance between lens array and object) and will also have a small array to sensor distance. Thus the overall separation between object and sensor on FIG. 2 can be small, and in particular can be significantly smaller than the object (or image) width. Note that the lens array of FIG. 2 cannot be effectively used in the arrangement of FIG. 1c, because there would not be enough room for insertion of the beam splitter.

Any light emitting device or element can be used for source 202. Suitable devices include organic light emitting diodes, semiconductor light emitting diodes, semiconductor lasers, incandescent filaments and fluorescent cells. The source can have a single emitting element, but preferably has multiple emitting elements to more efficiently illuminate a wide area of object 204.

As indicated above, a key advantage of the invention is provision of compact optical imaging systems. Accordingly, it is preferred for source 202 to be substantially planar and disposed perpendicular to an optical axis (from object 204 to sensor 208), for example as shown on FIG. 2. This source configuration enables minimization of object to sensor separation, and corresponding minimization of the overall imaging system size.

Figure 3A:
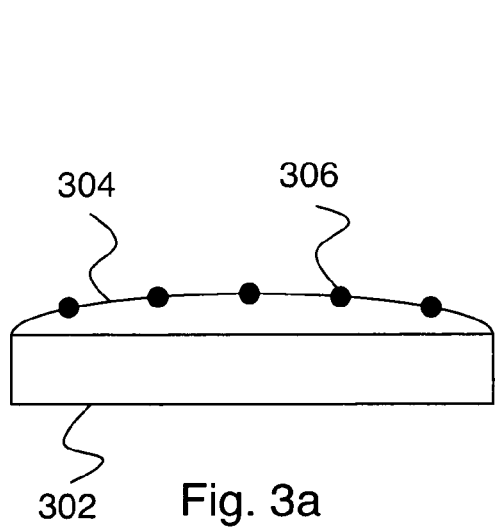
FIGS. 3a-b show an integrated optical source suitable for use in an alternate embodiment of the invention.
Figure 3B:
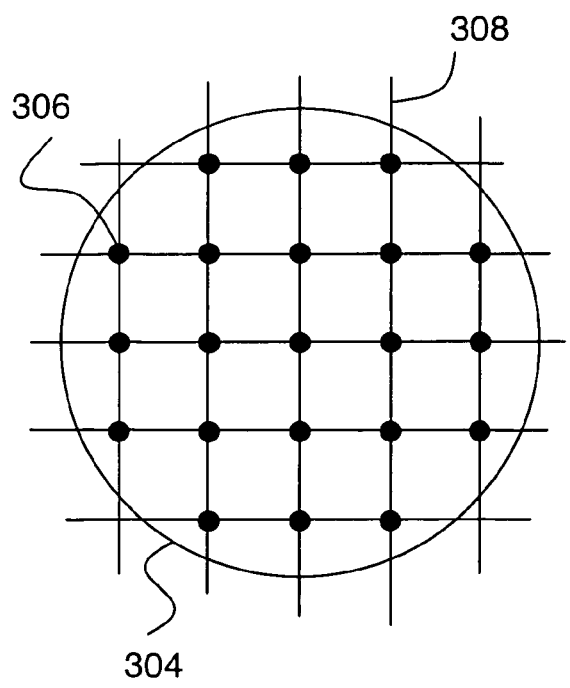

FIGS. 3a-b show part of an alternative embodiment of the invention in side and top views respectively. A lens 304 is disposed in contact with (or in proximity to) a sensor substrate 302. Light emitting elements 306 are disposed on a surface of lens 304. Elements 306 can be either transparent or opaque. As shown on FIG. 3b, elements 306 are arranged as an array connected by wires 308. In this example, the imaging assembly 206 and optical source 202 of FIG. 2 are integrated, which can reduce size and cost. Preferably, elements 306 are organic LEDs (OLEDs), since OLED technology is conducive to such integration. Organic LED materials are optically transmissive at their emission wavelength(s), which is particularly convenient for fabrication of sources suitable for use with the present invention. For example, OLED material can be spun directly onto a lens surface. Subsequent deposition of wires 308 can define many separate emitters in a single processing operation. The grid of FIG. 3b is a preferred arrangement, since the wires and elements of the resulting optical source 202 only block a small fraction of the light traveling from object 204 to sensor 208. OLED emitters are considered in U.S. Pat. No. 6,565,231. Integration of source with imaging assembly as on FIGS. 3a-b is often preferred, to reduce size and cost.

Figure 4:
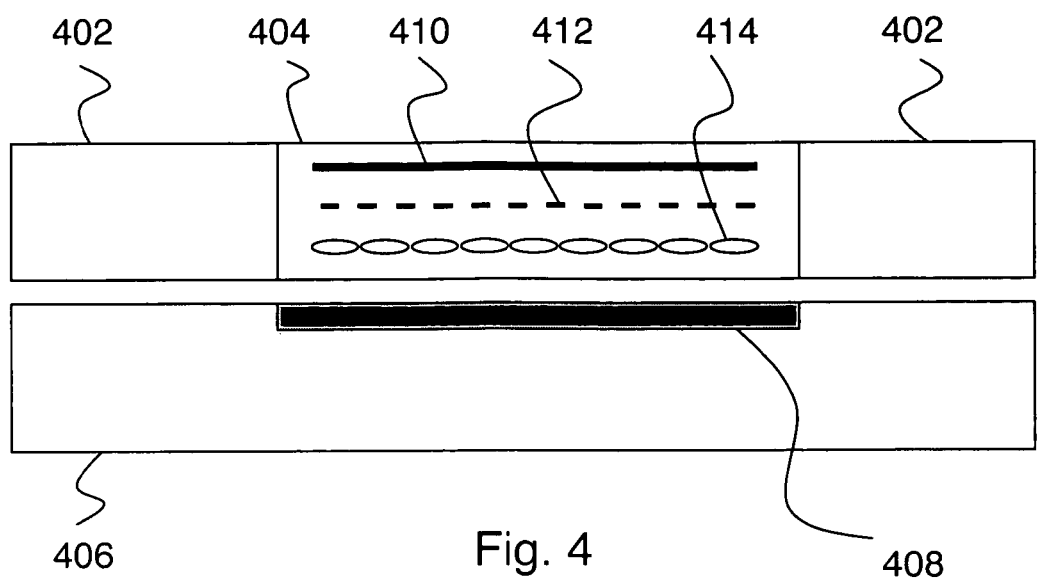
FIG. 4 shows an embodiment of the invention suitable for use as a biological implant.

FIG. 4 shows an embodiment of the invention applied to biological imaging with an implanted imaging unit. Biological implants are often required to be generally thin and flat, as opposed to being bulky block-like objects. Accordingly, provision of a compact imaging system according to the invention is especially advantageous for such applications. In the example of FIG. 4, an imaging unit 404 includes a source 412, an imaging assembly 414 and a sensor 410. Imaging unit 404 is implanted into a biological structure 402 (e.g., a human skull). Imaging unit 404 provides wide-field imaging of a region 408 of a biological tissue 406 (e.g., a human cerebral cortex). Thus optical imaging can be performed in vivo for long-term applications (e.g., monitoring and control of a prosthetic device for a limb). The invention is generally applicable to biological and non-biological applications. Exemplary non-biological applications include wide-field imaging systems, photocopying systems and optical scanning systems.

The preceding description has been by way of example as opposed to limitation. Accordingly, the invention can be practiced according to many variations of the above embodiments. For example, the order of source 202 and imaging assembly 206 on FIG. 2 can be exchanged. More generally, source 202 can be disposed at any position relative to the element or elements of imaging assembly 206, provided that position is at a location along an optical path from object 204 to sensor 208. Integration of source with imaging assembly (e.g., as on FIG. 3) is typically preferred to reduce cost and size. For imaging assemblies having multiple optical surfaces and an integrated source, the source can be disposed on any one, several, or even all optical surfaces of the imaging assembly.

A further advantage of the present invention is that fabrication and/or packaging costs can be reduced, since illumination is provided without the use of a beam splitter or the use of an off-axis illumination arrangement. This advantage of low cost can be realized in various embodiments of the invention, including embodiments lacking a lens array and/or not having a small working distance.

The invention claimed is:

1. An optical system for imaging an object, the system comprising:
   a) a sensor;
   b) an imaging assembly providing an image of the object to the sensor;
   c) an optical source disposed at a location on an optical path between the object and the sensor, wherein the optical source illuminates the object;
   wherein the imaging assembly substantially does not provide an image of the source to the sensor.

2. The optical system of claim 1, wherein said optical source substantially does not directly illuminate said sensor.

3. The optical system of claim 1, wherein said optical sensor is selected from the group consisting of photographic film, detector arrays, and charge-coupled device arrays.

4. The optical system of claim 1, wherein said imaging assembly comprises an element selected from the group consisting of lenses, mirrors, arrays of micro-optical elements, and any combination thereof.

5. The optical system of claim 1, wherein said optical source comprises two or more radiating elements, wherein the radiating elements are either transparent or opaque.

6. The optical system of claim 1, wherein said optical source comprises at least one emitting element selected from the group consisting of organic light emitting diodes, semiconductor light emitting diodes, semiconductor lasers, incandescent filaments and fluorescent cells.

7. The optical system of claim 1, wherein said optical source is positioned on an optical surface of said imaging assembly.

8. The optical system of claim 1, wherein said optical source is substantially planar and disposed perpendicular to an optical axis of said optical system.

9. The optical system of claim 1, wherein said optical source comprises two or more emitting elements connected by wires, wherein a substantial fraction of light from said object propagating toward said sensor is not blocked by the wires and emitting elements of the optical source.

10. A method for imaging an object, the method comprising:
    a) providing a sensor;
    b) providing an image of the object to the sensor with an imaging assembly;
    c) illuminating the object with an optical source disposed at a location on an optical path between the object and the sensor;
    wherein the imaging assembly substantially does not provide an image of the source to the sensor.

11. The method of claim 10, wherein said optical source substantially does not directly illuminate said sensor.

12. The method of claim 10, further comprising implanting said sensor, said imaging assembly and said optical source as an imaging unit into biological tissue.

13. The optical system of claim 1, wherein said optical source blocks some light from traveling from said object to said sensor.

14. The method of claim 10, wherein said optical source blocks some light from traveling from said object to said sensor.

* * * * *